US012134431B2

(12) United States Patent
Kamikawa et al.

(10) Patent No.: US 12,134,431 B2
(45) Date of Patent: Nov. 5, 2024

(54) ROBOT LEG STRUCTURE

(71) Applicant: SONY GROUP CORPORATION, Tokyo (JP)

(72) Inventors: Yasuhisa Kamikawa, Tokyo (JP); Kazuo Hongo, Tokyo (JP); Atsushi Sakamoto, Tokyo (JP); Yoshikazu Furuyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 670 days.

(21) Appl. No.: 17/296,641

(22) PCT Filed: Nov. 22, 2019

(86) PCT No.: PCT/JP2019/045884
§ 371 (c)(1),
(2) Date: May 25, 2021

(87) PCT Pub. No.: WO2020/116214
PCT Pub. Date: Jun. 11, 2020

(65) Prior Publication Data
US 2022/0017165 A1 Jan. 20, 2022

(30) Foreign Application Priority Data
Dec. 3, 2018 (JP) ................ 2018-226670

(51) Int. Cl.
B62D 57/02 (2006.01)
B60G 11/38 (2006.01)
(Continued)

(52) U.S. Cl.
CPC .............. B62D 57/02 (2013.01); B60G 11/38 (2013.01); B60G 13/08 (2013.01); B60G 13/10 (2013.01);
(Continued)

(58) Field of Classification Search
CPC ............................ B62D 57/02; B62D 57/032
See application file for complete search history.

(56) References Cited

U.S. PATENT DOCUMENTS 5,746,773 A    5/1998  Littig
8,808,395 B2   8/2014  Townsend et al.
(Continued)

FOREIGN PATENT DOCUMENTS

CN    103189020 A      7/2013
DE    102010049257 A1  4/2012
(Continued)

OTHER PUBLICATIONS

Machine Translation of JP-11320461-A (Year: 1999).*
(Continued)

Primary Examiner — Minnah L Seoh
Assistant Examiner — Hosam Shabara

(57) ABSTRACT

Provided is a robot leg structure that includes a link extending downward from a leg joint, a ground contact portion that comes in contact with a ground, a leaf spring that couples the link and the ground contact portion to each other, and a damping member adjacent to the leaf spring and couples the link and the ground contact portion to each other. With this configuration, the damping member damps the vibration attributed to the leaf spring, making it possible to reliably stabilize the motion of the legs of a robot.

16 Claims, 12 Drawing Sheets

(51) Int. Cl.
  *B60G 13/08* (2006.01)
  *B60G 13/10* (2006.01)
  *F16F 3/10* (2006.01)
  *F16F 13/00* (2006.01)

(52) U.S. Cl.
  CPC ................ *F16F 3/10* (2013.01); *F16F 13/00* (2013.01); *F16F 13/002* (2013.01)

(56) References Cited

U.S. PATENT DOCUMENTS

| | | | |
|---|---|---|---|
| 9,731,416 B1* | 8/2017 | Saunders | .................... B25J 9/14 |
| 2002/0143406 A1 | 10/2002 | Townsend et al. | |
| 2002/0143408 A1 | 10/2002 | Townsend et al. | |
| 2003/0028256 A1 | 2/2003 | Townsend et al. | |
| 2003/0163206 A1* | 8/2003 | Yasui | ................... B25J 17/0266 |
| | | | 623/24 |
| 2003/0191540 A1 | 10/2003 | Townsend et al. | |
| 2004/0117036 A1 | 6/2004 | Townsend et al. | |
| 2004/0122529 A1 | 6/2004 | Townsend et al. | |
| 2004/0186590 A1 | 9/2004 | Townsend et al. | |
| 2004/0186592 A1 | 9/2004 | Townsend et al. | |
| 2004/0225376 A1 | 11/2004 | Townsend et al. | |
| 2005/0011685 A1* | 1/2005 | Takenaka | ............. B62D 57/032 |
| | | | 180/8.6 |
| 2005/0016572 A1 | 1/2005 | Townsend et al. | |
| 2005/0177250 A1 | 8/2005 | Townsend et al. | |
| 2005/0273179 A1 | 12/2005 | Townsend et al. | |
| 2006/0030950 A1 | 2/2006 | Townsend et al. | |
| 2006/0178754 A1 | 8/2006 | Townsend et al. | |
| 2006/0185703 A1 | 8/2006 | Townsend et al. | |
| 2007/0013506 A1 | 1/2007 | Takenaka et al. | |
| 2007/0043449 A1* | 2/2007 | Herr | .......................... A61F 2/60 |
| | | | 623/24 |
| 2007/0106397 A1 | 5/2007 | Townsend et al. | |
| 2007/0126387 A1 | 6/2007 | Takenaka et al. | |
| 2007/0152620 A1 | 6/2007 | Takenaka et al. | |
| 2007/0213840 A1 | 9/2007 | Townsend et al. | |
| 2007/0213841 A1 | 9/2007 | Townsend et al. | |
| 2007/0219643 A1 | 9/2007 | Townsend et al. | |
| 2008/0183302 A1 | 7/2008 | Townsend et al. | |
| 2008/0188950 A1* | 8/2008 | Fleury | .................. B01F 27/707 |
| | | | 623/53 |
| 2008/0281436 A1 | 11/2008 | Townsend et al. | |
| 2013/0218298 A1 | 8/2013 | Mosler | |
| 2013/0338795 A1* | 12/2013 | Townsend | ................. A61F 2/60 |
| | | | 623/55 |
| 2015/0305894 A1 | 10/2015 | Mosler | |
| 2019/0142612 A1 | 5/2019 | Endo et al. | |

FOREIGN PATENT DOCUMENTS

| | | |
|---|---|---|
| EP | 1372545 A2 | 1/2004 |
| EP | 1372546 A2 | 1/2004 |
| EP | 1372547 A1 | 1/2004 |
| EP | 1372548 A1 | 1/2004 |
| EP | 1549265 A1 | 7/2005 |
| EP | 1613250 A1 | 1/2006 |
| EP | 1695799 A1 | 8/2006 |
| EP | 1698439 A2 | 9/2006 |
| EP | 1698440 A1 | 9/2006 |
| EP | 1729695 A2 | 12/2006 |
| EP | 1729696 A2 | 12/2006 |
| EP | 1729697 A1 | 12/2006 |
| EP | 1729698 A2 | 12/2006 |
| EP | 1729699 A1 | 12/2006 |
| EP | 1765229 A2 | 3/2007 |
| EP | 2632392 A2 | 9/2013 |
| JP | 11320461 A * | 11/1999 |
| JP | 2004-526508 A | 9/2004 |
| JP | 2004-526509 A | 9/2004 |
| JP | 2004-530468 A | 10/2004 |
| JP | 2005-503840 A | 2/2005 |
| JP | 2005-253127 A | 9/2005 |
| JP | 2006-500151 A | 1/2006 |
| JP | 2006-525820 A | 11/2006 |
| JP | 2007-530236 A | 11/2007 |
| JP | 2007-530237 A | 11/2007 |
| JP | 2007-530238 A | 11/2007 |
| JP | 2007-530245 A | 11/2007 |
| JP | 2007-530246 A | 11/2007 |
| JP | 2008-501481 A | 1/2008 |
| JP | 4126063 B2 | 7/2008 |
| JP | 4126064 B2 | 7/2008 |
| JP | 2013-086205 A | 5/2013 |
| JP | 5-293776 A | 9/2013 |
| JP | 2016-14301 A | 1/2016 |
| JP | 2017-90180 A | 5/2017 |
| KR | 10-1112499 B1 | 4/2012 |
| KR | 10-1112500 B1 | 4/2012 |
| KR | 10-1112501 B1 | 4/2012 |
| RU | 2013124007 A | 12/2014 |
| WO | 2002/078566 A2 | 10/2002 |
| WO | 2002/078567 A2 | 10/2002 |
| WO | 2002/078577 A1 | 10/2002 |
| WO | 2002/078578 A1 | 10/2002 |
| WO | 2004/028416 A1 | 4/2004 |
| WO | 2004/096104 A1 | 11/2004 |
| WO | 2005/051608 A2 | 6/2005 |
| WO | 2005/051611 A1 | 6/2005 |
| WO | 2005/051612 A1 | 6/2005 |
| WO | 2005/097007 A2 | 10/2005 |
| WO | 2005/097008 A2 | 10/2005 |
| WO | 2005/097009 A1 | 10/2005 |
| WO | 2005/097010 A2 | 10/2005 |
| WO | 2005/097011 A1 | 10/2005 |
| WO | 2005/122973 A2 | 12/2005 |
| WO | 2006/107329 A1 | 10/2006 |
| WO | 2012/062279 A2 | 5/2012 |
| WO | 2014/076837 A1 | 5/2014 |
| WO | 2017/212708 A1 | 12/2017 |

OTHER PUBLICATIONS

International Search Report and Written Opinion of PCT Application No. PCT/JP2019/045884, issued on Dec. 17, 2019, 16 pages of ISRWO.

Boston Dynamics, "SoftBank Robotics and SoftBank Conduct Demonstration Experiment for Utilization of Boston Dynamics "SpotMini" on Construction Sites", Dec. 4, 2019, 2 pages.

Yasuhiro et al., "Development of Flexibility-Variable Foot Soles Using Jamming Transition Phenomenon for Uneven-Ground Bipedal Robots", The Robotics Society of Japan, Sep. 7, 2011.

* cited by examiner

LARGE AMOUNT OF DEFORMATION IN DIRECTION IN WHICH SHOCK ABSORPTION IS DESIRED

SMALL AMOUNT OF DEFORMATION IN TORSIONAL DIRECTION IN WHICH SHOCK ABSORPTION IS NOT REQUIRED

ROBOT LEG STRUCTURE

FIELD

The present disclosure relates to a robot leg structure.

BACKGROUND

Conventionally, for example, in Patent Literature 1 below includes description related to an artificial foot mechanism equipped with a tibial member corresponding to the tibia of a human and a foot member corresponding to the foot of a human, in which the foot member is formed of an elastic material and has its upper end coupled to the lower end portion of the tibial member, with at least the lower end portion curved so as to be displaced in a front direction toward the lower end, and the foot member includes a spring constant adjusting means so that the spring constant varies in a width direction.

CITATION LIST

Patent Literature

Patent Literature 1: JP H11-291189 A

SUMMARY

Technical Problem

However, in the structure described in the above Patent Literature, there is a problem that vibration occurs in the elastic member when the foot comes into contact with the ground because the foot member is formed of an elastic member. When such a structure is applied to a robot, the behavior of the robot would be unstable, leading to tumbling of the robot.

In particular, robots pass not only on flat ground but also in various places such as slopes, uneven roads, and stairs. In such a case, vibration occurring on the robot might cause a problem in the walking of the robot.

In view of this, there has been a demand for stabilizing the motion of the legs of the robot.

Solution to Problem

According to the present disclosure, a robot leg structure is provided that includes: a link extending downward from a leg joint; a ground contact portion that comes in contact with a ground; an elastic member that couples the link and the ground contact portion to each other; and a damping member that is arranged adjacent to the elastic member and couples the link and the ground contact portion to each other.

DESCRIPTION OF EMBODIMENTS

A preferred embodiment of the present disclosure will be described in detail hereinbelow with reference to the accompanying drawings. Note that redundant descriptions will be omitted from the present specification and the drawings by assigning the same reference signs to components having substantially the same functional configuration.

Note that the description will be provided in the following order.

1. Premise
2. Robot leg structure according to present embodiment
2.1. Overall configuration
2.2. Specific configuration
3. Modification

1. Premise

A leg mechanism of a mobile body such as a robot includes an actuator that drives a joint. In order to ensure a desired driving force, the power of the actuator is decelerated at a high reduction ratio and transmitted to the joint. In a leg robot having such a mechanism with a high reduction ratio, there is a demand for a technique that protects the reduction gear of each of joints against an impact load, with a lightweight structure. This is because the high reduction ratio increases the load on the actuator when an impact is applied.

Some shock absorbing structures are generally the type used in hydraulic suspensions such as those used in automobiles, but application of this type of structure to lightweight robots would involve difficulties. In addition, in leg robots equipped with a lightweight artificial leg leaf spring structure under various examinations, there is a problem that control is difficult because of increased vibration and vulnerability against the load in the torsional direction. Furthermore, in the structure equipped with a leaf spring structure, interference might occur with the legs in the stepped uneven terrain.

2. Robot Leg Structure According to Present Embodiment

2.1. Overall Configuration

In the robot leg structure according to the present embodiment, an arc-shaped leaf spring is arranged at a position of a below-knee joint or below, and a damping member having a damper component is arranged in parallel with the arc-shaped leaf spring. Preferably, the damping member is located inside the arc of the leaf spring.

Figure 1:
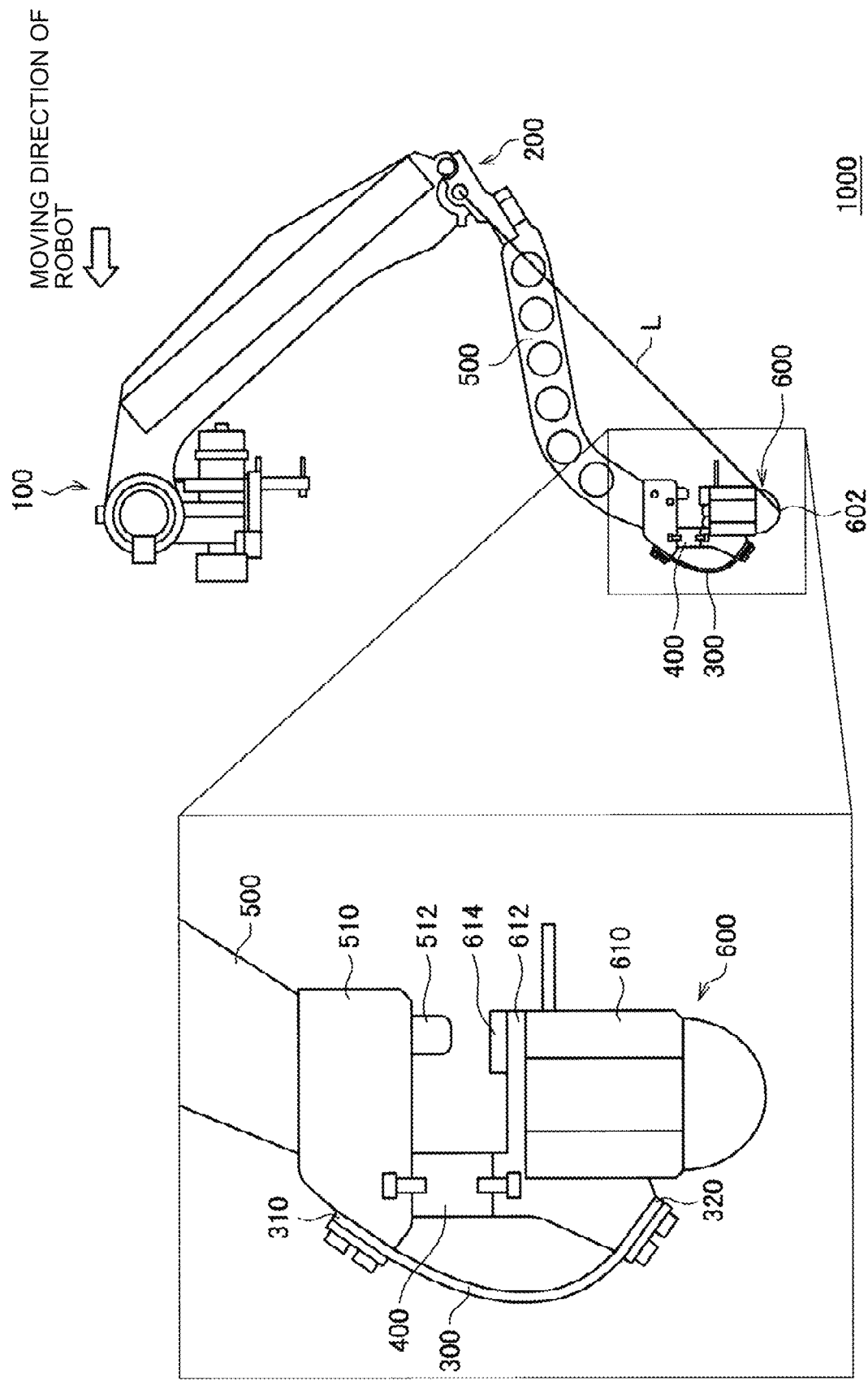
FIG. 1 is a schematic view illustrating a robot leg structure 1000 according to one embodiment of the present disclosure.

FIG. 1 is a schematic view illustrating a robot leg structure 1000 according to one embodiment of the present disclosure. The figure on the right side of FIG. 1 illustrates an overall picture of the robot leg structure 1000. The figure on the left side of FIG. 1 illustrates an enlarged view of a tip portion of the robot leg structure 1000. As illustrated in FIG. 1, the robot leg structure 1000 has a hip joint 100 and a knee joint 200, as well as a leaf spring 300 having an arc shape and a damping member 400 arranged in parallel with the leaf spring 300, which are provided below the knee joint 200. The leaf spring 300 and the damping member 400 couple a shank link 500 extending downward from the knee joint 200 and a ground contact portion 600 in contact with the ground to each other. The damping member 400 is formed with a rubber component having a damping function (damper component). In FIG. 1, the robot basically moves toward the left in the page. The leaf surface of the leaf spring 300 faces in a traveling direction of the robot. Furthermore, the leaf spring 300 is curved so as to protrude in the traveling direction of the robot.

With such a configuration, the weight reduction of the shock absorbing structure can be achieved by the leaf spring 300, and the damping effect of the damping member 400 can achieve improved controllability accompanying the vibration suppression of the leaf spring 300. In addition, the characteristic arc-shaped leaf spring 300 simultaneously achieves avoidance of interference with the ground on a stepped uneven terrain.

2.2. Specific Configuration

As illustrated in FIG. 1, the joint arrangement of the leg structure 1000 includes the hip joint 100 and the knee joint 200. In addition, the main structure of the shank link 500 is a structure passing a side near the hip joint 100 with respect to a line L connecting the knee joint 200 and a ground contact point 602.

The hip joint 100 is configured to operate on a drive source (actuator) via a wave gear, while the knee joint 200 is configured to operate on a drive source obtained by rotationally transforming a straight motion elastic actuator (SEA).

The ground contact portion 600 is equipped with a 3-axis force sensor 610. A tip 510 of the shank link 500 is fastened to a root 310 of the leaf spring 300 having an arc shape, and a tip 320 of the leaf spring 300 is fastened to the 3-axis force sensor 610.

Furthermore, a base 612 of the 3-axis force sensor 610 and the tip 510 of the shank link 500 are coupled to each other via the damping member 400. This achieves suppression of vibration in the leaf spring 300.

Furthermore, the base 612 of the 3-axis force sensor 610 has a stopper 614, while the tip 510 of the shank link 500 has a stopper 512. When the leaf spring 300 is bent, the stopper 614 and the stopper 512 come into contact with each other to prevent the leaf spring 300 from being permanently deformed due to an overload.

Figure 2A:
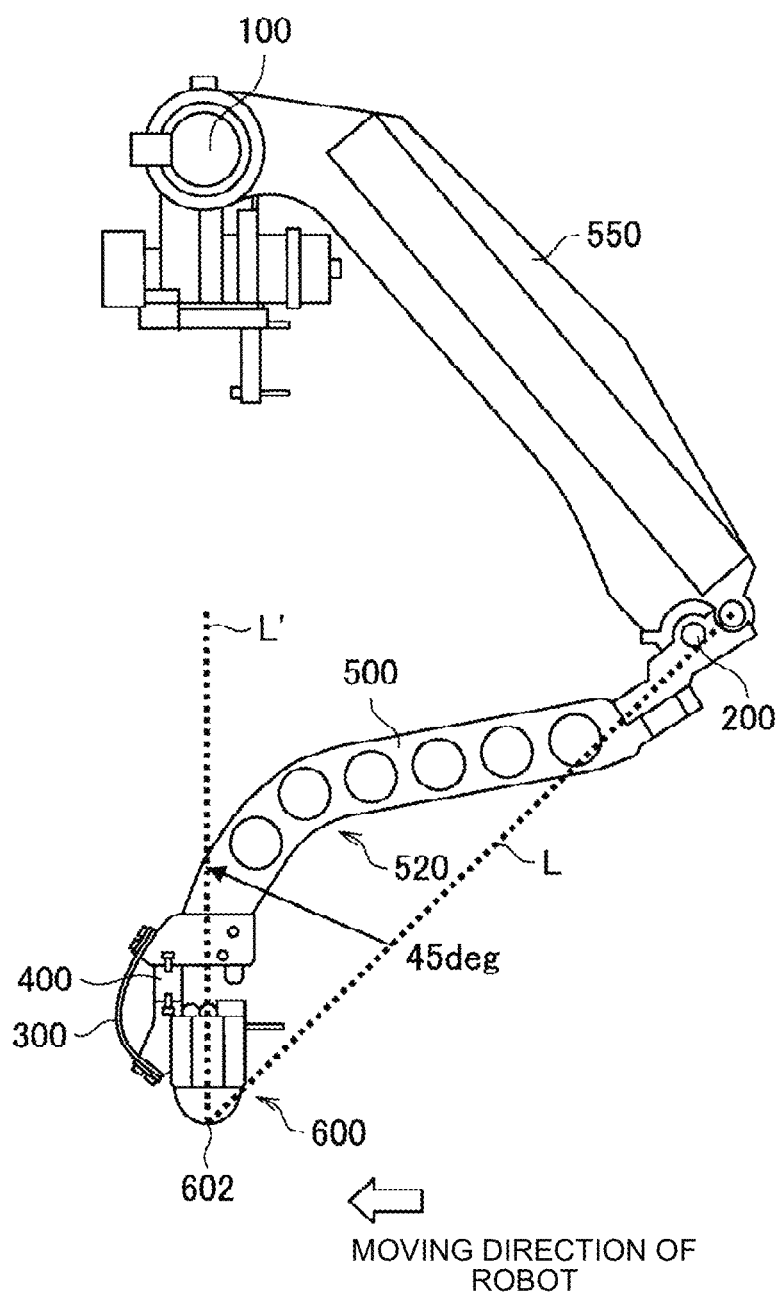
FIG. 2A is a schematic view illustrating a configuration in which a leaf spring is arranged so as to extend in a direction of a line obtained by rotating a line connecting a knee joint and a ground contact point by 45° or more toward a hip joint.

As illustrated in FIG. 2A, the leaf spring 300 having an arc shape is arranged so as to extend in a direction of a line L' obtained by rotating the line L connecting the knee joint 200 and the ground contact point 602 by 45° or more toward the hip joint 100. Preferably, the leaf spring 300 is arranged in front of the line L' in a moving direction of the robot. Furthermore, the shank link 500 has a protruding shape toward an upper side, providing a clearance structure 520 on the lower side. The hip joint 100 and the knee joint 200 are coupled to each other by a link 550.

Figure 2B:
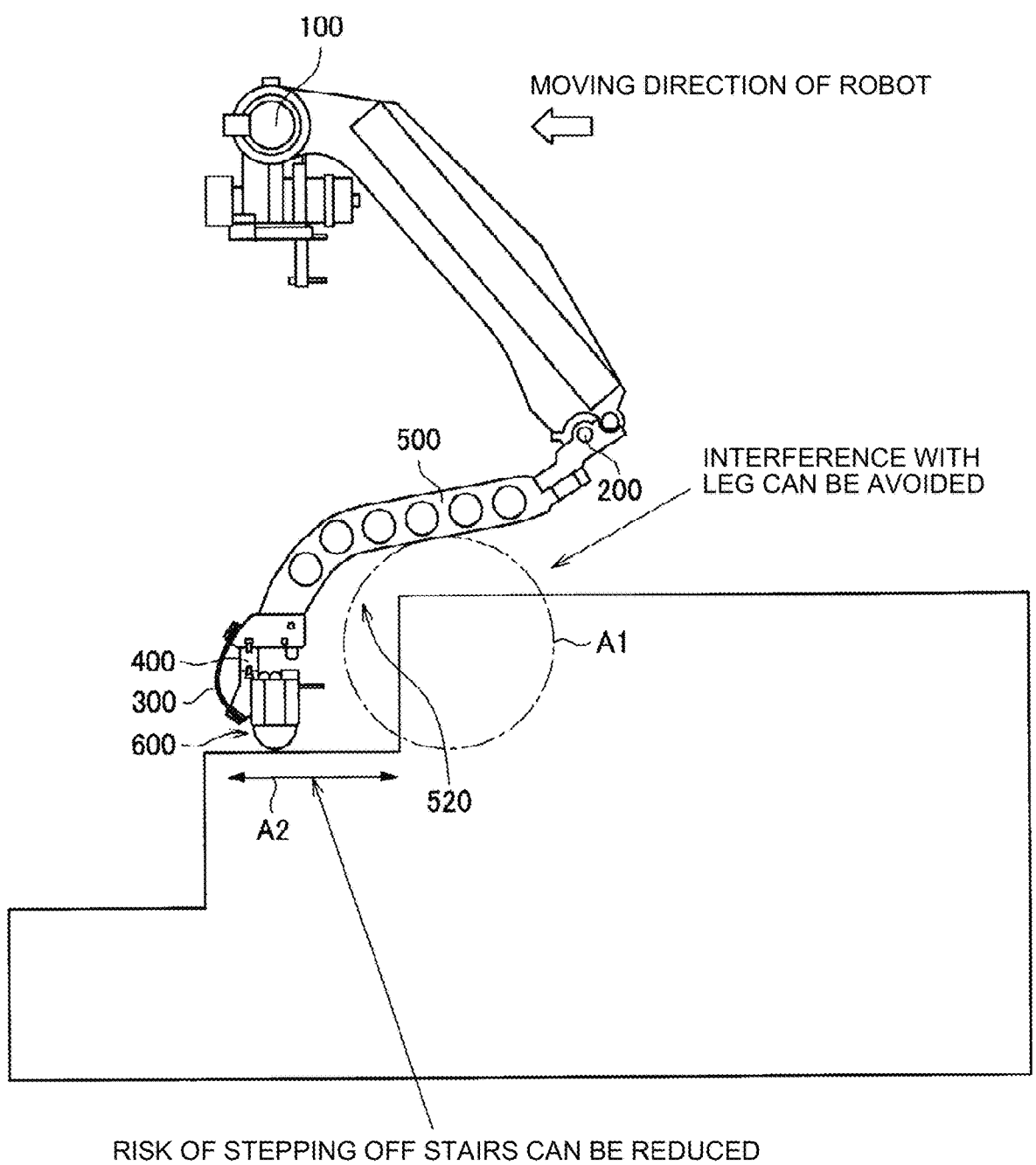
FIG. 2B is a schematic view illustrating a state in which interference between a leg structure and stairs can be avoided because the leaf springs are not arranged at the positions of the protrusions of the stairs when traversing an uneven terrain.

With such a configuration, as illustrated in a region A1 of the one-dot chain line in FIG. 2B, the leaf spring 300 would not be arranged at the position of the protrusion of the stairs when traversing the stepped uneven terrain, making it possible to reliably avoid the interference between the leg structure 1000 and the stairs. Furthermore, this configuration increases the degree of freedom in arranging the ground contact point 602 with respect to the stairs as illustrated with an arrow A2 in FIG. 2B, making it possible to suppress the risk of stepping off the stairs.

Figure 3:
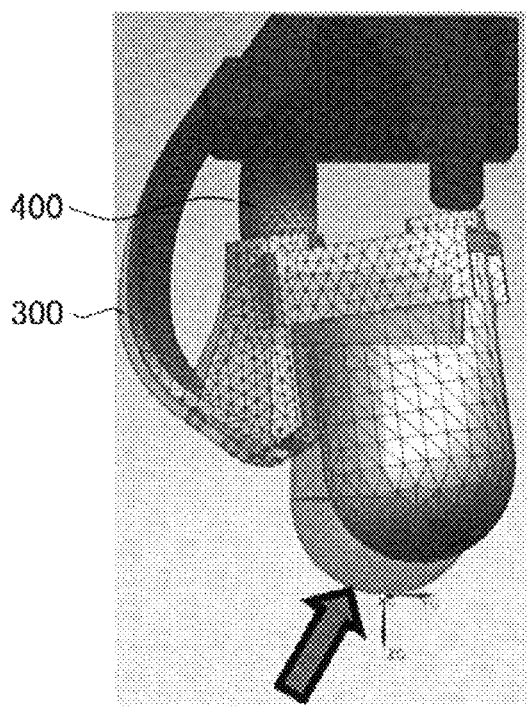
FIG. 3 is a schematic view illustrating shock absorption performance according to a torsional direction of a leaf spring 300.
Figure 3:
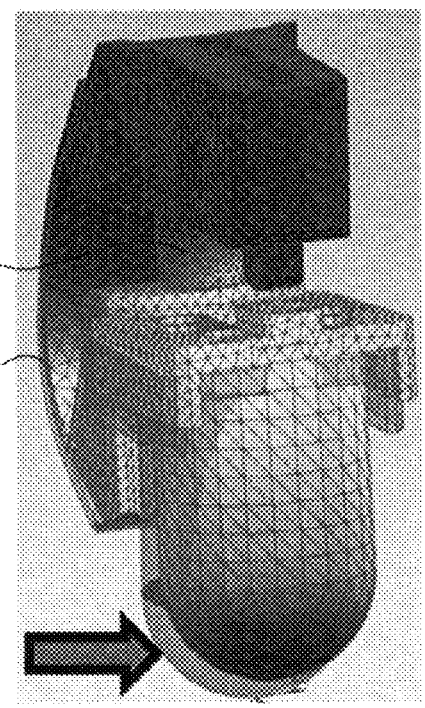

FIG. 3 is a schematic view illustrating shock absorption performance according to the torsional direction of the leaf spring 300. As illustrated in FIG. 3, having an arc shape, the leaf spring 300 lowered its rigidity against a load in the torsional direction requiring shock absorption, while maintaining high rigidity against a load in the torsion direction not requiring shock absorption. In other words, the leaf spring 300 has relatively low rigidity toward the load from the front side in the moving direction of the robot illustrated in FIG. 1, while maintaining high rigidity against the load in a direction orthogonal to the moving direction of the robot (vertical direction on the surface of the page). This makes it possible to improve the controllability toward the load.

In addition, by arranging the 3-axis force sensor 610 between the ground contact point 602 and the tip 320 of the leaf spring 300, it is possible to estimate the amount of deformation of the leaf spring 300 when a load is applied based on the correlation between a deformation model of the leaf spring 300 illustrated in FIG. 3 and an output value of the 3-axis force sensor 610.

3. Modification

Figure 4:
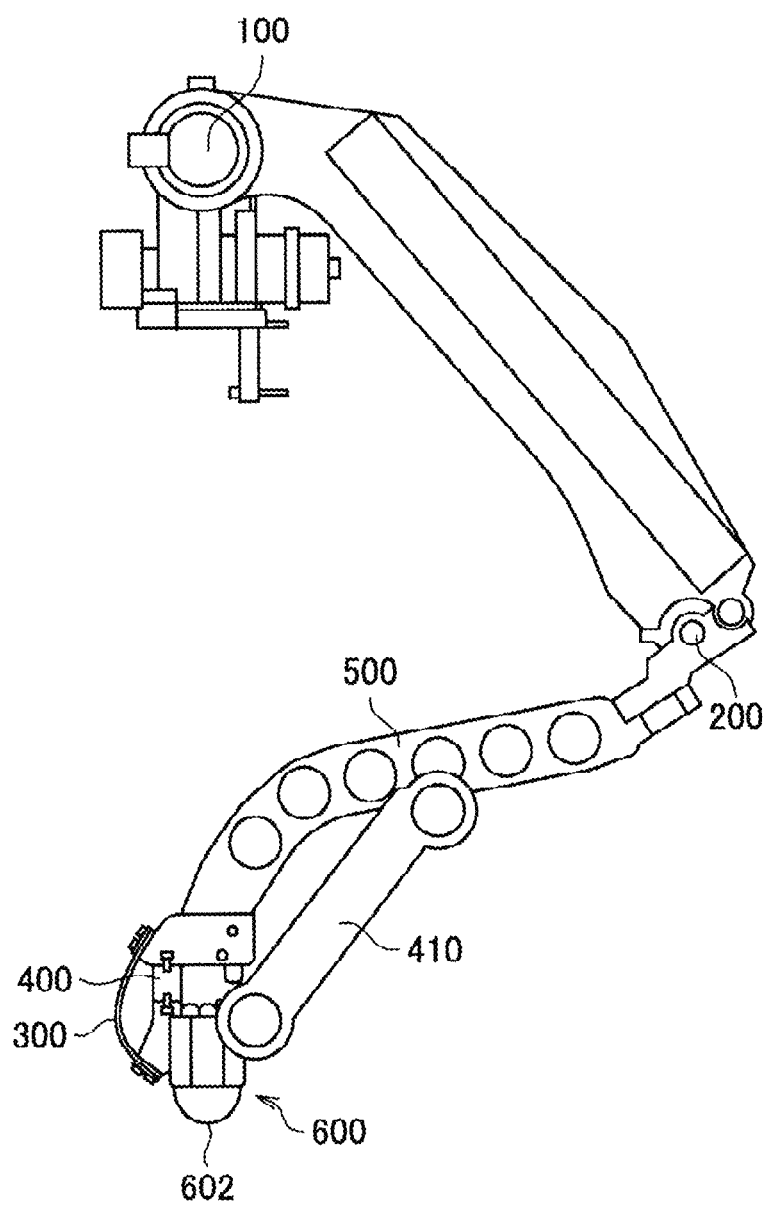
FIG. 4 is a schematic view illustrating a modification when a rod 410 using a fluid such as hydraulics or pneumatics is used as a damper-type functional component instead of a rubber component, as a damping member 400.

Hereinafter, some modifications of the present embodiment will be described. FIG. 4 is a schematic view illustrating a modification when a rod 410 using a fluid such as hydraulics or pneumatics is used as a damping member 400 as a damper-type functional component instead of a rubber component. By using a structure in which the base 612 of the 3-axis force sensor 610 and the shank link 500 are coupled to each other by using the rod 410 having a damper function, it is possible to increase the viscosity coefficient, leading to an increased damping factor. This makes it possible to obtain an effect of significantly suppressing vibration.

Figure 5:
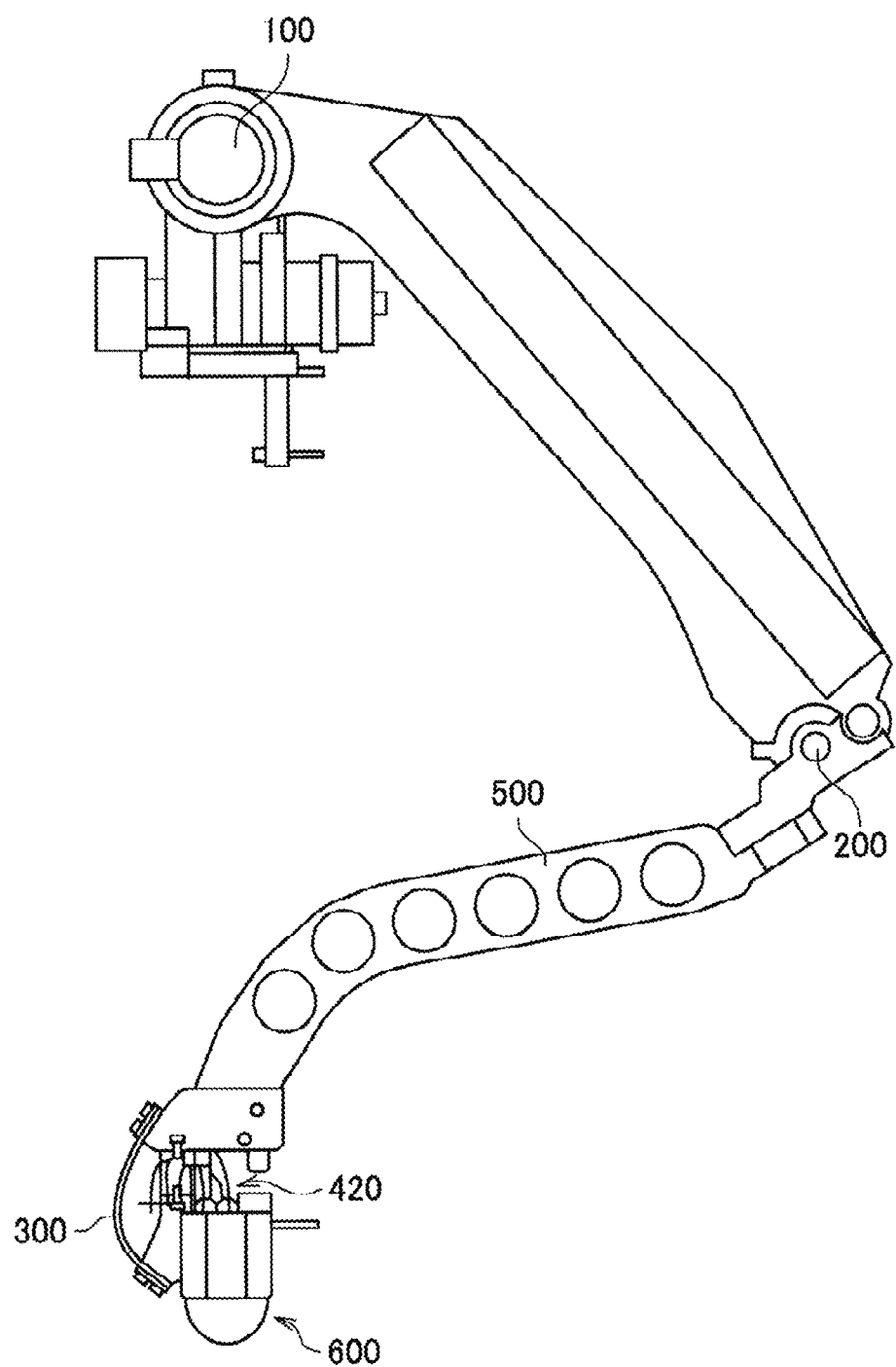
FIG. 5 is a schematic view illustrating a modification that adopts a wire rope vibration isolator 430 using frictional force instead of a rubber component, as the damping member 400.

FIG. 5 is a schematic view illustrating a modification that adopts a wire rope vibration isolator 430 using frictional force instead of a rubber component, as the damping member 400. In this example, the base 612 of the 3-axis force sensor 610 and the shank link 500 are coupled to each other by using the wire rope vibration isolator 430. This makes it possible to improve the durability of the damping member 400 having a damper function.

Figure 6:
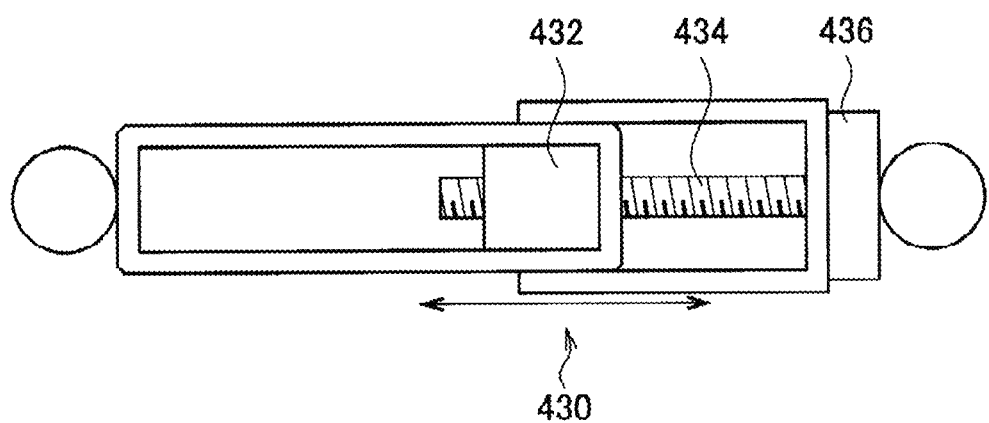
FIG. 6 is a schematic view illustrating a modification using a functional rod 430 that combines a damper using a fluid and a damper using friction.

FIG. 6 is a schematic view illustrating a modification using a functional rod 430 which is a combination of a damper using a fluid and a damper by friction, which is used instead of the rod 410 illustrated in FIG. 4. Similarly to FIG. 4, the functional rod 430 couples the base 612 of the 3-axis force sensor 610 and the shank link 500 to each other. The functional rod 430 is equipped with a sliding screw nut 432 and a sliding screw 434 in a transmission mechanism that transforms linear motion into rotation, and transforms the movement of the sliding screw nut 432 in a rod longitudinal direction into the rotational movement of the sliding screw 434. This rod has a structure of a linear motion rod including a rotating fluid damper 436 in a rotating part of the sliding screw 434.

With this structure, it is possible to achieve a damper functional component in which the friction component of the sliding screw nut 432 and the sliding screw 434 is combined with a viscous component obtained by transforming the viscous component of the fluid damper 436 on the rotating side into linear motion, leading to achievement of a desired damping factor with a compact structure.

Figure 7:
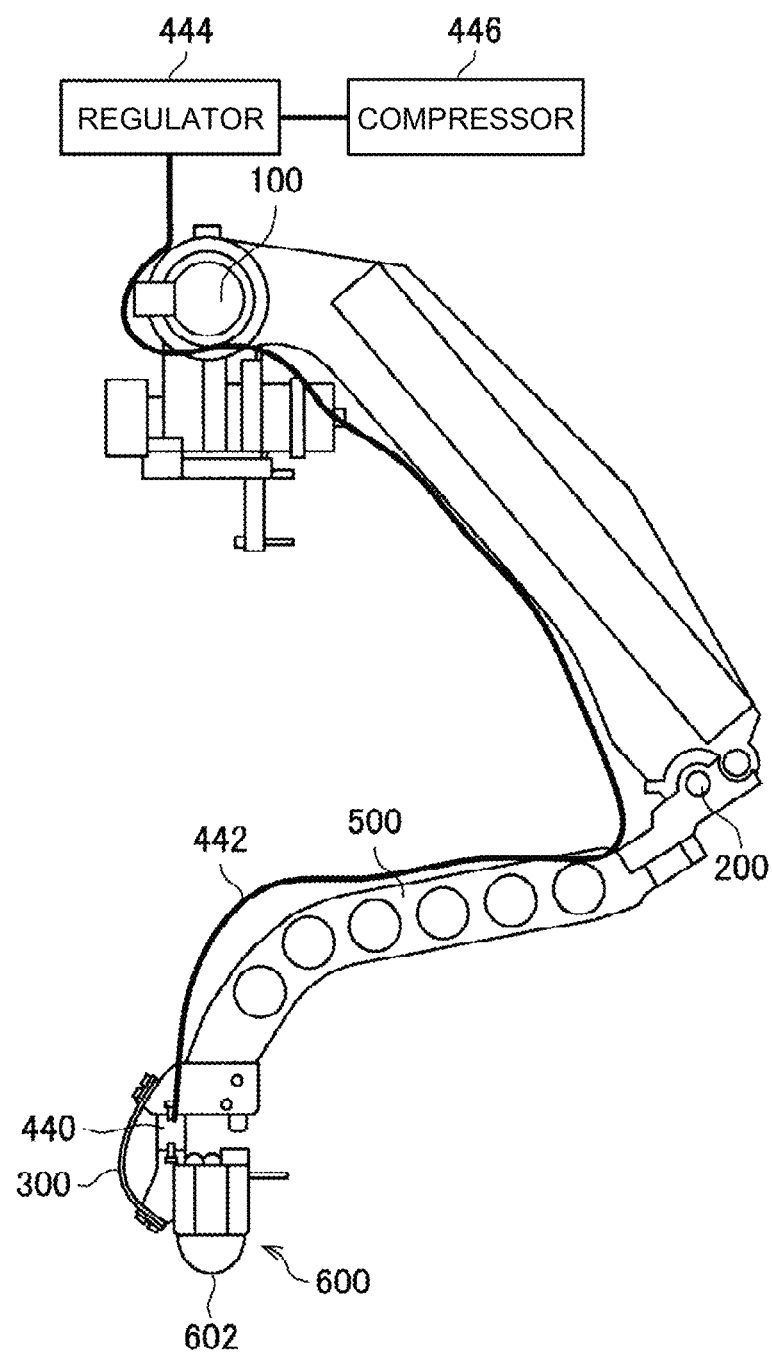
FIG. 7 is a schematic view illustrating a modification using a jamming structure 440.

FIG. 7 is a schematic view illustrating a modification in which a jamming structure 440 is used as the damping member 400, instead of the rubber component. When using the jamming structure 440, the jamming structure 440 is coupled to a regulator 444 and a compressor 446 through a pipe 442. The jamming structure 440 is a structure in which the elastic modulus increases when deflated, and the elastic modulus decreases when inflated. The inflation/deflation of the jamming structure 440 is performed by the regulator 444 and the compressor 446. This makes it possible to change the elastic modulus that contributes to the shock absorbing function in accordance with the state of the ground.

Figure 8A:
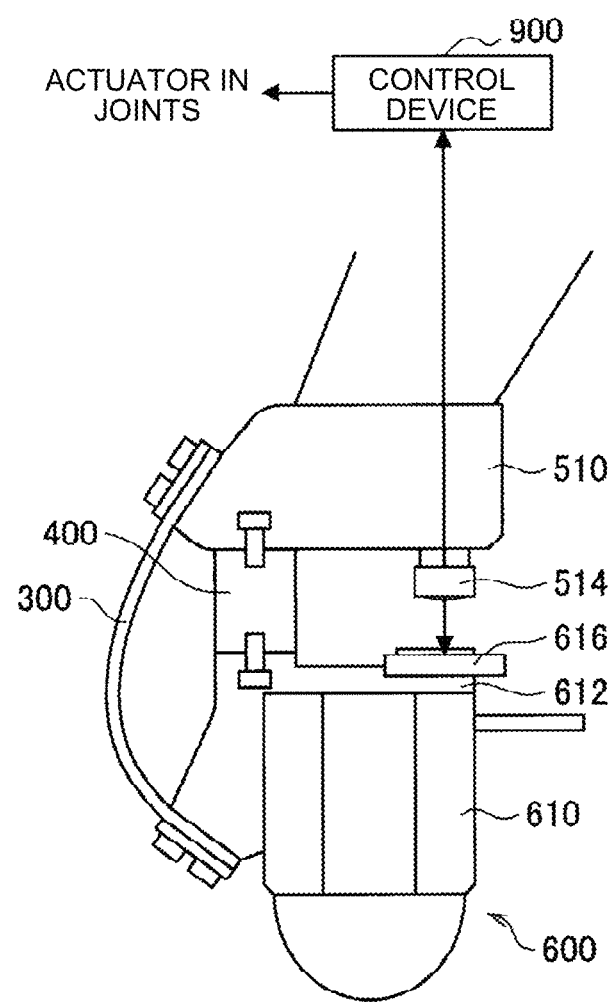
FIG. 8A is a schematic view illustrating a modification in which the amount of deformation of the leaf spring is estimated by measuring the correlation between the position of the base of a 3-axis force sensor and a tip of a shank link, and the force at the ground contact point is detected from a design value of the leaf spring.
Figure 8B:
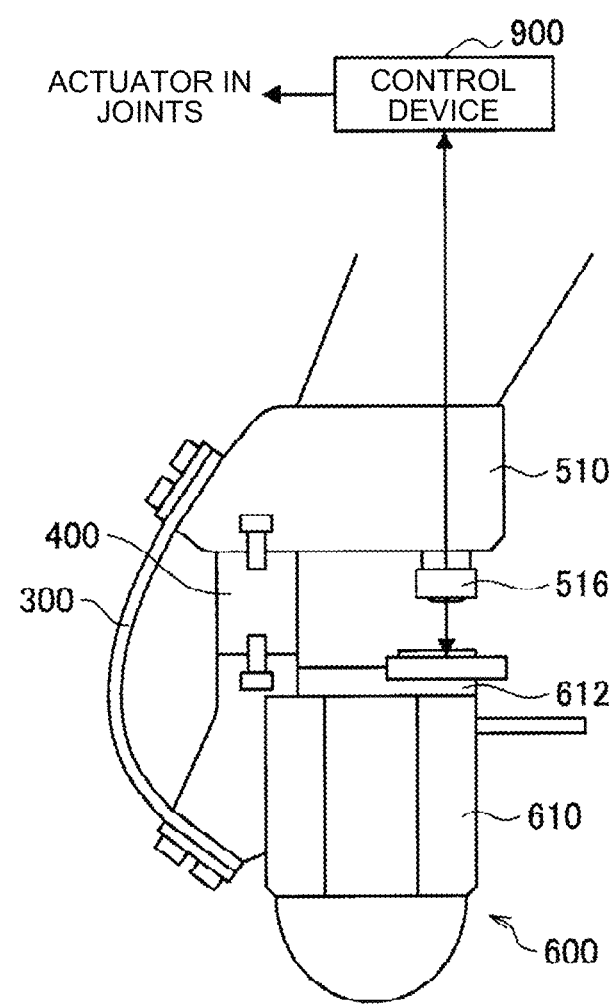
FIG. 8B is a schematic view illustrating a modification in which the amount of deformation of the leaf spring is estimated by measuring the correlation between the position of the base of a 3-axis force sensor and a tip of a shank link, and the force at the ground contact point is detected from a design value of the leaf spring.

FIGS. 8A and 8B are schematic views illustrating a modification in which the amount of deformation of the leaf spring 300 is estimated by measuring the correlation between the position of the base 612 of the 3-axis force sensor 610 and the tip 510 of the shank link 500, and then the force at the ground contact point 602 is detected from a design value of the leaf spring 300. In the configuration illustrated in FIG. 8A, a ranging sensor 514 is disposed at the tip 510 of the shank link 500, and a reflector 616 is disposed at the base 612 of the 3-axis force sensor 610 to detect the displacement of the distance between the two points. Furthermore, in the configuration illustrated in FIG. 8B, a laser unit 516 is disposed at the tip 510 of the shank link 500, and a light receiving element 612 is disposed at the base of the 3-axis force sensor 610, enabling three-dimensional measurement of the relative positional relationship between the two points. After acquisition of the amount of deformation of the leaf spring 300 in the measurement, a control device 900 controls the actuators of the hip joint 100 and the knee joint 200 based on the amount of deformation of the leaf spring 300. This makes it possible to optimally control the hip joint 100 and the knee joint 200 by utilizing the force at the ground contact point 602 based on the amount of deformation of the leaf spring 300.

Figure 9:
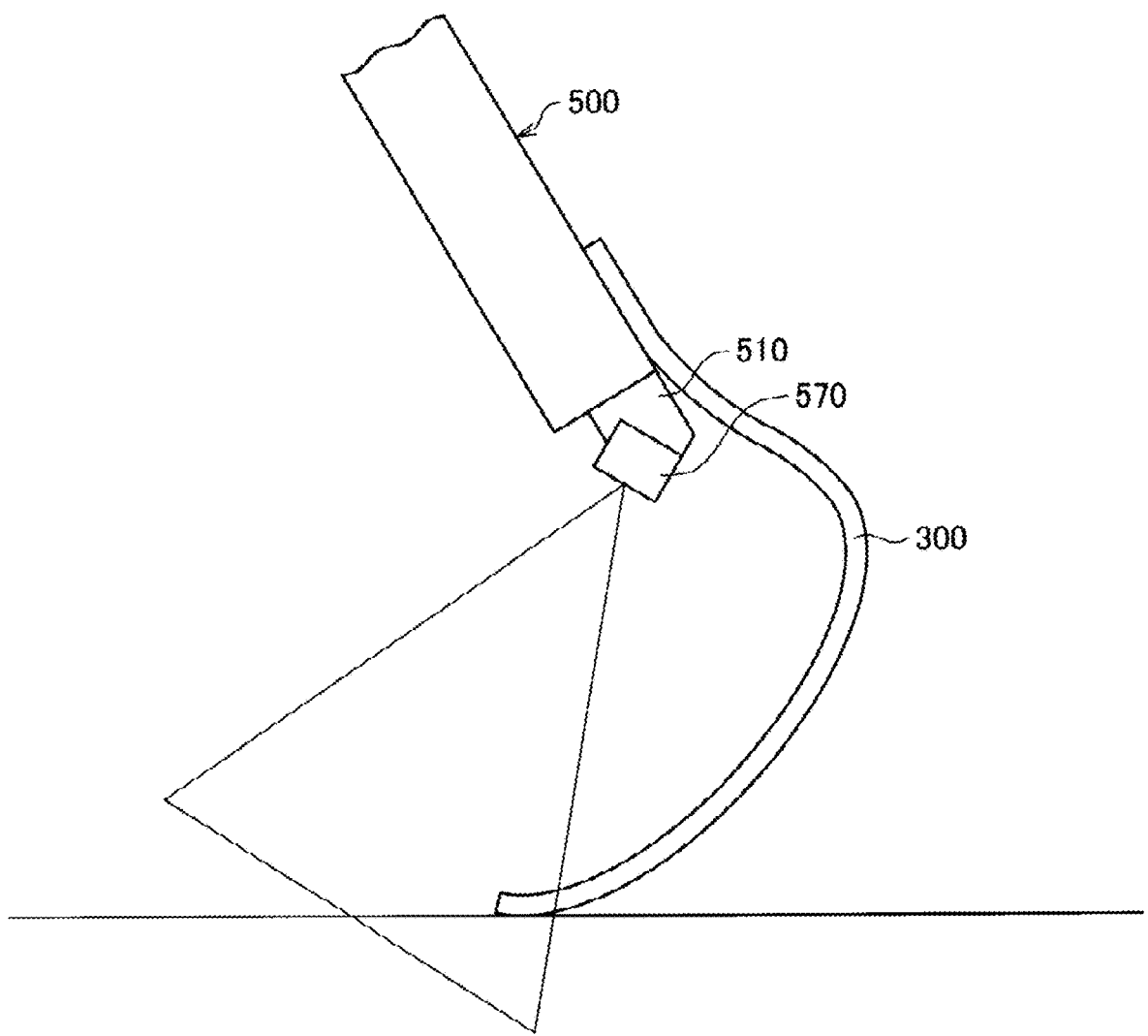
FIG. 9 is a schematic view illustrating a modification in which a camera 570 is arranged at a tip 510 of a shank link 500.

FIG. 9 is a schematic view illustrating a modification in which a camera 570 is arranged at a tip 510 of a shank link 500. In the example illustrated in FIG. 9, the leaf spring 300 is configured to be in direct contact with the ground. By observing an image on the back side of the part where the leaf spring 300 is in contact with the ground with the camera 570 at the tip 510 of the shank link 500, it is possible to perform three-dimensional detection of the movement amount of a feature point on the back side of the leaf spring 300. Furthermore, it is also possible to grasp the condition of the ground based on a peripheral image of the background on the back side of the leaf spring 300. This makes it possible to obtain the amount of deformation of the leaf spring 300 based on the image analysis, leading to detection of the force at the ground contact point 602 based on the design value of the leaf spring 300, similarly to the examples of FIGS. 8A and 8B. This achieves control of the robot by utilizing the force at the ground contact point.

As described above, the hip joint 100 includes an actuator decelerated by a wave gear, as a drive source. Moreover, the knee joint 200 includes a series elastic actuator (SEA) as a drive source. With this configuration, when an impact is applied to the ground contact portion 600 or the like, it is possible to reduce the load on the knee joint 200 mainly by the series elastic actuator, and possible to reduce the load on the hip joint 100 mainly by the arc-shaped leaf spring 300 at a position of the below-knee joint or below.

Figure 10:
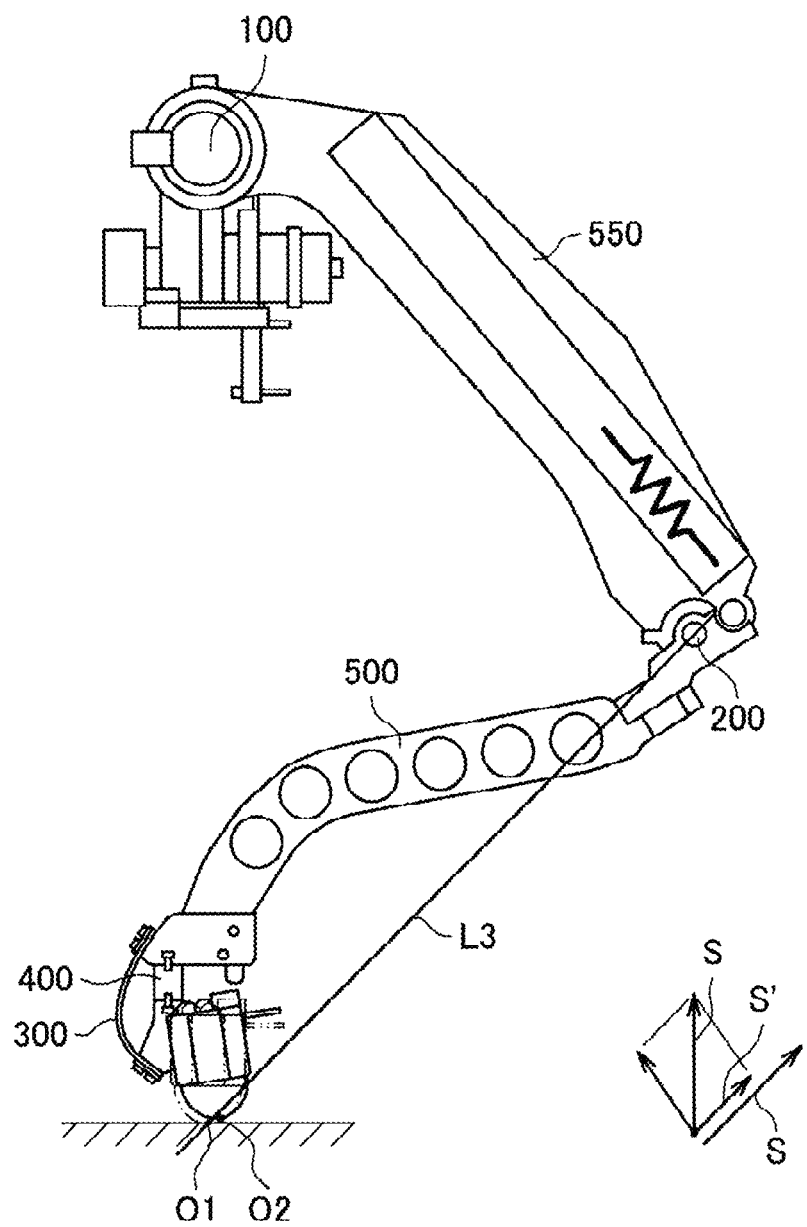
FIG. 10 is a schematic view in a case where a line segment L3 connecting a ground contact point O1 and a rotation center of a knee joint 200 is defined in a state where the leaf spring 300 is not bent, the view illustrating a state in which the ground contact point O1 moves to a region opposite to a hip joint 100 with respect to a line segment L1, when the leaf spring 300 is bent.

In order to exert the above functions, as illustrated in FIG. 10, in a case where a line segment L3 connecting the ground contact point O1 and a rotation center of the knee joint 200 is defined in a state where the leaf spring 300 is not bent, the ground contact point O1 moves to a region opposite to the hip joint 100 with respect to a line segment L1 so as to reach a point O2, when the leaf spring 300 is bent. That is, the moving direction from the ground contact point O1 to the ground contact point O2 runs in the direction of the line segment L3. With such a configuration, the leaf spring 300 is bent as illustrated in FIG. 10, and this takes time until the load is actually transmitted to the hip joint 100, making it possible to reliably absorb the impact applied to the hip joint 100.

More specifically, as illustrated in FIG. 10, when the ground contact point O1 moves toward the hip joint 100 by a stroke S when the leaf spring 300 is bent, a component S' in the line segment L1 direction of the stroke S would be applied to the knee joint 200. Since the elastic force attributed to the deformation of the leaf spring 300 does not sufficiently act in the direction of the component S', the impact would be transmitted to the hip joint 100 in a short time. In this case, when the impact applied when the leaf spring 300 is bent is large, the hip joint 100 including the actuator decelerated by the wave gear might be damaged.

By contrast, according to the present embodiment, the moving direction of the ground contact point when the leaf spring 300 is bent is the direction of the line segment L3 connecting the ground contact point O1 and the rotation center of the knee joint 200. Therefore, the elastic force attributed to the deformation of the leaf spring 300 will act sufficiently while the ground contact point moves in the direction of the line segment L3, allowing the impact to be transmitted to the hip joint 100 over a longer period of time. This makes it possible for the leaf spring 300 to reliably absorb the impact applied to the hip joint 100. With this configuration, the hip joint 100, which has an actuator decelerated by the wave gear and is relatively vulnerable to impact, can be reliably protected against the impact.

Furthermore, since the series elastic actuator is used as the drive source, the impact load is to be absorbed by an elastic part of the series elastic actuator. Therefore, the impact load can be reliably suppressed in any of the hip joint 100 and the knee joint 200.

In the above-mentioned example, the leaf spring 300, the damping member 400, and the ground contact portion 600 according to the present embodiment are provided on the robot leg structure 1000. However, these members can be provided on a mobile body such as a drone as well. For example, by coupling the ground contact portion 600 to the surface of the drone via the leaf spring 300 and the damping member 400 to form a shock absorbing structure, it is possible to reduce the impact applied to a main body of the drone when landing at high speed or when falling, without significantly increasing the weight.

Furthermore, by providing a damping member 400 and a ground contact portion 600 at the tip of the arm in a robot that has an arm that strikes a hammer or a drum or that plays tennis, it is possible to absorb a high impact load when generated at the tip of the arm. Even in such a case, since the load applied to the joint is limited to the load in a certain direction, it is effective in protecting the reduction gear at the root joint of the arm.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

Note that the following configurations also belong to the technical scope of the present disclosure.

(1)
  A robot leg structure comprising:
  a link extending downward from a leg joint;
  a ground contact portion that comes in contact with a ground;
  an elastic member that couples the link and the ground contact portion to each other; and
  a damping member that is arranged adjacent to the elastic member and couples the link and the ground contact portion to each other.

(2)
  The robot leg structure according to (1), wherein the elastic member is constituted with a leaf spring that is curved by the ground contact portion coming in contact with the ground.

(3)
  The robot leg structure according to (2), wherein a leaf surface of the leaf spring is oriented in a traveling direction of a robot.

(4)
  The robot leg structure according to (3), wherein the leaf spring is curved so as to protrude in the traveling direction.

(5)
  The robot leg structure according to any one of (1) to (4), wherein the damping member is formed of a rubber material.

(6)
  The robot leg structure according to any one of (1) to (4), wherein the damping member performs damping by utilizing hydraulics or pneumatics.

(7)
  The robot leg structure according to any one of (1) to (4), wherein the damping member performs damping by utilizing friction.

(8)
  The robot leg structure according to any one of (1) to (4), wherein the damping member performs damping by transforming a movement in a linear direction into a movement in a rotational direction.

(9)
  The robot leg structure according to any one of (1) to (4), wherein the damping member has a jamming structure having rigidity that changes with introduction of air.

(10)
  The robot leg structure according to any one of (1) to (9),
  wherein the link extends from a ground contact point between the ground contact portion and the ground toward the leg joint in a direction opposite to a moving direction of a robot, and
  the link is curved so as to protrude toward an upper side.

(11)
  The robot leg structure according to any one of (1) to (11), further comprising a stopper configured to avoid direct contact between the link and the ground contact portion when the elastic member is bent.

(12)
  The robot leg structure according to (2),
  wherein the link extends from the ground contact point between the ground contact portion and the ground toward the leg joint in a direction opposite to a moving direction of a robot, and
  the leaf spring is arranged at a position obtained by rotating a line segment connecting the ground contact point and a rotation center of the leg joint by 45° in a traveling direction of the robot with the ground contact point as the rotation center.

(13)
  The robot leg structure according to (12), wherein the leaf spring is arranged closer to the traveling direction of the robot than a position obtained by rotating the line segment by 45°.

(14)
  The robot leg structure according to (2),
  wherein the leg joint includes:
  a first joint connected to a side of the link that is opposite to a point of the link coupled to the ground contact portion;
  a second link connected to the link via the first joint and extending above the first joint; and
  a second joint connected to the second link at a side opposite to the first joint side of the second link,
  wherein the first joint is driven by a series elastic actuator as a drive source, and
  the second joint has a drive source decelerated by a wave gear.

(15)
  The robot leg structure according to (14),
  wherein the link extends from the ground contact point between the ground contact portion and the ground toward the first joint in a direction opposite to a moving direction of a robot,
  the second link extends from the first joint toward the second joint in the moving direction of the robot, and
  in a case where a line segment connecting the ground contact point and a rotation center of the first joint is defined in a state where the leaf spring is not bent, the ground contact point moves to a region on a side opposite to the second joint with respect to the line segment, when the leaf spring is bent.

REFERENCE SIGNS LIST

100 HIP JOINT
200 KNEE JOINT

300 LEAF SPRING
400 DAMPING MEMBER
600 GROUND CONTACT PORTION
1000 LEG STRUCTURE

The invention claimed is:

1. A robot leg structure, comprising:
a leg joint;
a first link that extends downward from the leg joint;
a ground contact portion configured to be in contact with a ground;
an elastic member that couples the first link with the ground contact portion;
a damping member adjacent to the elastic member, wherein the damping member couples the first link with the ground contact portion; and
a stopper configured to avoid direct contact between the first link and the ground contact portion in a case where the elastic member is bent.

2. The robot leg structure according to claim 1, wherein the elastic member includes a leaf spring, and
the leaf spring is configured to be curved by the ground contact portion based on the contact of the ground contact portion with the ground.

3. The robot leg structure according to claim 2, wherein an orientation of a leaf surface of the leaf spring is in a moving direction of a robot.

4. The robot leg structure according to claim 3, wherein the leaf spring is curved to protrude in the moving direction.

5. The robot leg structure according to claim 2, wherein the first link extends from a ground contact point toward the leg joint in a direction opposite to a moving direction of a robot,
the ground contact point is between the ground contact portion and the ground,
the leaf spring is at a position based on a rotation of a line segment by 45° in the moving direction of the robot,
the line segment connects the ground contact point and a rotation center of the leg joint, and
the ground contact point corresponds to the rotation center.

6. The robot leg structure according to claim 5, wherein the leaf spring is closer to the moving direction of the robot than the position.

7. The robot leg structure according to claim 2, wherein the leg joint includes:
a first joint connected to a first side of the first link that is opposite to a point of the first link coupled to the ground contact portion;
a second link connected to the first link via the first joint, wherein the second link extends and extending above the first joint; and
a second joint connected to the second link at a second side opposite to a third side of the first joint, wherein the first joint is drivable by a series elastic actuator as a first drive source, and
the second joint includes a second drive source decelerated by a wave gear.

8. The robot leg structure according to claim 7, wherein the first link extends from a ground contact point toward the first joint in a direction opposite to a moving direction of a robot,
the ground contact point is between the ground contact portion and the ground,
the second link extends from the first joint toward the second joint in the moving direction of the robot,
the ground contact point is movable to a region on a fourth side opposite to the second joint with respect to a line segment, in a case where the leaf spring is bent, and
the line segment connects the ground contact point and a rotation center of the first joint in a case where the leaf spring is not bent.

9. The robot leg structure according to claim 1, wherein the damping member includes a rubber material.

10. The robot leg structure according to claim 1, wherein the damping member is configured to perform a damping operation based on one of hydraulics or pneumatics.

11. The robot leg structure according to claim 1, wherein the damping member is configured to perform a damping operation based on friction.

12. The robot leg structure according to claim 1, wherein the damping member includes a functional rod, and
the damping member is configured to perform a damping operation by transformation of a movement of the functional rod in a linear direction into a movement of the functional rod in a rotational direction.

13. The robot leg structure according to claim 1, wherein the damping member has a jamming structure, and
the jamming structure has a rigidity that changes with introduction of air.

14. The robot leg structure according to claim 1, wherein the first link extends from a ground contact point toward the leg joint in a direction opposite to a moving direction of a robot,
the ground contact point is between the ground contact portion and the ground, and
the first link is curved to protrude toward an upper side of the robot leg structure.

15. A robot leg structure, comprising:
a leg joint;
a first link that extends downward from the leg joint;
a ground contact portion configured to be in contact with a ground;
an elastic member that couples the first link with the ground contact portion; and
a damping member adjacent to the elastic member, wherein
the damping member couples the first link with the ground contact portion, and
the damping member is configured to perform a damping operation based on friction.

16. A robot leg structure, comprising:
a first link;
a ground contact portion configured to be in contact with a ground;
a leg joint that includes:
a first joint connected to a first side of the first link that is opposite to a point of the first link coupled to the ground contact portion;
a second link connected to the first link via the first joint, wherein the second link extends above the first joint; and
a second joint connected to the second link at a second side opposite to a third side of the first joint, wherein
the first joint is drivable by a series elastic actuator as a first drive source,
the second joint includes a second drive source decelerated by a wave gear, and
the first link extends downward from the leg joint;

an elastic member that couples the first link with the ground contact portion, wherein
the elastic member includes a leaf spring, and
the leaf spring is configured to be curved by the ground contact portion based on the contact of the ground contact portion with the ground; and
a damping member adjacent to the elastic member, wherein the damping member couples the first link with the ground contact portion.

* * * * *